United States Patent
Akin et al.

(10) Patent No.: US 11,913,551 B2
(45) Date of Patent: Feb. 27, 2024

(54) HOUSING SEAL, METHOD FOR THE AUTOMATED APPLICATION OF A HOUSING SEAL, AND HOUSING COMPRISING A HOUSING SEAL

(71) Applicant: TESA SE, Norderstedt (DE)

(72) Inventors: Deniz Nick Akin, Hamburg (DE); Wilhelm Watzke, Hamburg (DE); Li Wang, Hamburg (DE); Kim Elsenbach, Bargteheide (DE)

(73) Assignee: TESA SE, Norderstedt (DE)

( * ) Notice: Subject to any disclaimer, the term of this patent is extended or adjusted under 35 U.S.C. 154(b) by 125 days.

(21) Appl. No.: 17/792,274

(22) PCT Filed: Jan. 13, 2021

(86) PCT No.: PCT/EP2021/050584
§ 371 (c)(1),
(2) Date: Jul. 12, 2022

(87) PCT Pub. No.: WO2021/144306
PCT Pub. Date: Jul. 22, 2021

(65) Prior Publication Data
US 2023/0111496 A1    Apr. 13, 2023

(30) Foreign Application Priority Data
Jan. 15, 2020   (DE) ............ 10 2020 200 450.1

(51) Int. Cl.
*F16J 15/02*   (2006.01)
(52) U.S. Cl.
CPC ........... *F16J 15/022* (2013.01); *F16J 15/028* (2013.01)
(58) Field of Classification Search
CPC .......... F16J 15/02; F16J 15/022; F16J 15/028; F16J 15/10; F16J 15/102
See application file for complete search history.

(56) References Cited

U.S. PATENT DOCUMENTS

| | | | | |
|---|---|---|---|---|
| 2012/0326391 A1* | 12/2012 | Hirose | ............... | F16J 15/102 277/637 |
| 2014/0367926 A1* | 12/2014 | Guan | ............... | B29C 39/18 427/322 |
| 2015/0369365 A1* | 12/2015 | Hirose | ............... | C09J 11/06 277/637 |

FOREIGN PATENT DOCUMENTS

| | | |
|---|---|---|
| DE | 9106710 U1 | 11/1991 |
| DE | 10308375 A1 | 9/2003 |

(Continued)

OTHER PUBLICATIONS

German Office Action dated Aug. 18, 2020, in connection with German Application No. 10 2020 200 450.1.

(Continued)

*Primary Examiner* — Gilbert Y Lee

(74) *Attorney, Agent, or Firm* — Norris McLaughlin, P.A.

(57) ABSTRACT

Housing seals and methods seal off a housing interior from a housing exterior. The housing seals and methods comprise an elastic adhesive strip that is arranged between a first housing element and a second housing element, wherein the adhesive strip comprises a first end portion having a first edge face, and a second end portion having a second edge face, wherein the adhesive strip and is arranged between the first housing element and the second housing element in such a way that the first and second edge faces lie substantially in a plane, the adhesive strip is arranged between the first housing element and the second housing element in a closed circulation, and the first edge face of the adhesive strip is in contact with the second edge face of the adhesive strip and forms a sealing gap.

13 Claims, 6 Drawing Sheets

(56) References Cited

FOREIGN PATENT DOCUMENTS

Figure 1:
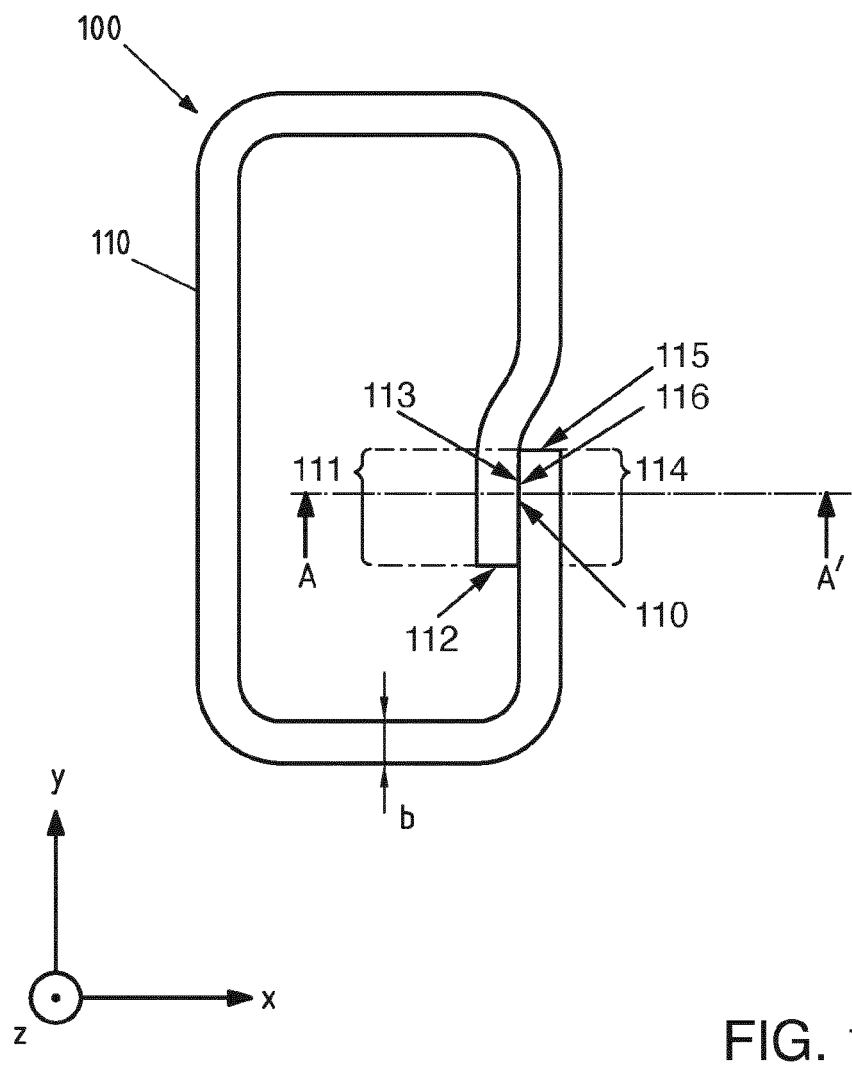

| | | |
|---|---|---|
| DE | 102010038429 A1 | 1/2012 |
| DE | 202018105005 U1 | 7/2019 |
| EP | 1235007 A2 | 8/2002 |
| EP | 2194108 A1 | 6/2010 |
| EP | 2541104 A2 | 1/2013 |
| EP | 3346518 A1 | 7/2018 |
| EP | 3401455 A1 | 11/2018 |
| WO | 2016/024939 A1 | 2/2016 |

OTHER PUBLICATIONS

International Search Report dated Mar. 18, 2022, in connection with PCT International Application No. PCT/EP2021/050584.
English translation of International Search Report dated Mar. 18, 2022, in connection with PCT International Application No. PCT/EP2021/050584.

* cited by examiner

HOUSING SEAL, METHOD FOR THE AUTOMATED APPLICATION OF A HOUSING SEAL, AND HOUSING COMPRISING A HOUSING SEAL

This application is a 371 of PCT/EP2021/050584, filed Jan. 13, 2021, which claims foreign priority benefit under 35 U.S.C. § 119 of the German Patent Application No. 10 2020 200 450.1, filed Jan. 15, 2020, the disclosures of which are incorporated herein by reference.

The invention relates to a housing seal. The invention also relates to a method for automated application of a housing seal, and to a housing comprising a housing seal.

The invention relates to the technical field of the seals as are employed in the household and in industry widely for the purposes of sealing off and preventing fluid communication between two volumes. Proposed more specifically for the sealing off is a housing seal where the seal is not inherently closed but instead consists of infinitely long sealing strips.

Seals are required for numerous constructions in different fields of the art, such as in building construction and in vehicle construction, for example. The sealing elements used for these purposes are intended to seal off gaps, such as are formed almost unavoidably when two components are connected, frequently to counter penetration by moisture and air, in order to preserve parts situated behind the seals from damage caused by such air and moisture ingress, such as against corrosion, for example. Mechanical connections, of the kind produced by bolts, for example, are as a general rule not capable of providing sufficient sealing.

Use is therefore made frequently, for example, of silicone sealants in order to achieve corresponding sealing of the connections produced. Such sealants can be processed very reliably, but require a certain time to cure and so often give rise to processing difficulties. A similar situation arises with other structural adhesives and sealants, such as with those based on epoxies or polyurethanes, for example.

Sealants used also include silicone foams, which are notable for good flame retardancy properties and the possibility of being used again. It is, though, difficult to process them in an automated operation, and they are also comparatively expensive.

Butyl sealants are established and inexpensive, but in terms of their metering are difficult to control and lack good aging resistance. When the pressing pressures are relatively high, moreover, they are frequently squeezed out of the sealing gap.

Elastic sealants such as natural rubbers or else styrene-butadiene rubbers offer tried-and-tested sealing properties and are also very temperature-stable. Because they are not self-adhering, however, they are fairly difficult to manage; moreover, they are inflexible, and so the sealing element in question must be an exact fit with the gap that is to be sealed.

Polyurethane foams exhibit good compression characteristics and can be processed in an automated manner; moreover, foam-in-place applications are possible. A disadvantage are fluctuations in the dimensions of the foam in question, and these substances are also susceptible to corrosion and degradation when exposed to certain cleaning products.

A similar profile of properties is displayed by EPDM foams, which also achieve only limited sealing effect on account of their irregular surface configuration.

EP 3 346 518 A1 discloses a seal which is applied to a cover and/or tub of a battery module housing. In this instance a sealing material is let into a depression in order to improve a sealing effect. The seal is a "form-in-place foam gasket" (FIPFG), where liquid foam is applied to a cover or tub of a housing. This application has the aforesaid disadvantages arising for foamed or liquid-applied sealants.

DE 9 106 710 U1 discloses a multipartite flat seal, where a flat seal is composed of multiple portions of a conventional sealing material. The parts are connected to one another via serpentine incisions performed complementarily, in order to achieve a form-fit at the contact points.

A disadvantage of this is that the parts of which the flat seal is composed are costly and inconvenient to produce and process. The operation of application also is very costly and inconvenient, as the parts have to be placed matchingly into one another. The multipartite flat seal described has little to no suitability for automated application, owing to the very exacting requirements for precision of application.

DE 20 2018 105 005 U1 discloses a multipartite flat seal with metal insert and positioning pins. The metal insert serves as a "positioning rail" for the elastomer seal injection-molded onto it. The positioning rails can be placed against one another and thus larger seals can be assembled without the need to produce large diecuts for this purpose. The sealing approach described is very complex in production and use, as it is composed of various components.

The portions more particularly are not continuous material, instead consisting of metal portions which must be manufactured individually and adapted to the sealing shape.

There is therefore a need for systems which are simple to employ and process for the reliable sealing of connections between structural components.

It is an object of the invention to provide a sealing material which is easy to apply, has a high sealing effect with respect to air and moisture, and which offers the possibility, as well, of allowing the sealed-off opening or connection point to be opened again and closed again without complication.

One application is in the area of battery modules. The modules contain a multiplicity of battery cells, which must be protected in a housing from mechanical exposure from externally, but also against the effects of moisture. For this purpose typically between housing cover and housing tub there is a flange formed, which is sealed off by a sealant. The use of sealants has the disadvantages described above.

It is an object of the invention to overcome the disadvantages stated for sealants above. It is an object of the invention, moreover, to enable simple and reliable automated application of the housing seal.

The object is achieved in its first aspect by a housing seal having the features of claim 1.

The invention relates accordingly to a housing seal for sealing off a housing interior from a housing exterior, comprising an
elastic adhesive strip which is arranged between a first housing element and a second housing element,
characterized in that
 the adhesive strip comprises a first end portion having a first edge face, and a second end portion having a second edge face, and is arranged between the first housing element and the second housing element in such a way that
 the first and second edge faces lie substantially in a plane, and
 the adhesive strip is arranged between the first housing element and the second housing element in a closed circulation, and
 the first edge face of the adhesive strip is in contact with the second edge face of the adhesive strip and forms a sealing gap, so that if the first housing element and the second housing element are pressed against one another with a force F, the elastic adhesive strip is compressed and it expands in the direction of the edge faces, with the effect that the first edge face of the first adhesive strip and the second edge face of the adhesive strip are pressed against one another and seal off the sealing gap, thereby preventing fluid communication between the housing interior and the housing exterior.

The sealing is now accomplished, accordingly, by means of an adhesive tape which is separated by a length into adhesive strips and can be applied in an automated manner and in a specific arrangement to housing elements, and so permits 100% automated application and sealing.

The invention is based on the finding that by means of an arrangement according to the invention it is possible to generate a sealing closed ring, composed of an elastic adhesive strip which is not inherently closed, that withstands watertightness and corrosion tests, from a continuous elastic adhesive tape—that is, not a diecut flat seal but rather an adhesive strip which is unwound from an adhesive tape roll and removed. This arrangement more particularly meets requirements of watertightness and corrosion tests for the sealing of battery casings in the E-mobility sector. A particular feature of the invention described here is therefore that the housing seal is constructed of only one adhesive strip. Use is made conventionally of seals which are inherently closed, such as sealing rings or a flat seal diecut from a sheet. These seals do not have any gap or interruption, but instead form an inherently closed and uninterrupted circulation.

In accordance with the invention an elastic adhesive strip which is infinitely long and not inherently closed is arranged on a housing element, such as a sealing flange of a housing, for example, in such a way that the closing of the housing is accompanied by a sealing effect which reliably prevents penetration of moisture and air into the housing interior. The adhesive strip in this arrangement forms a not completely closed circulation. The circulation may describe any desired profile or contour. The circulation is not closed because it is interrupted by the sealing gap. The circulation of the adhesive strip is located preferably in a plane—that is, the adhesive strip is applied, i.e., adhered, on a housing element, lying in a plane.

The sealing material used in the invention is formed by elastic adhesive strips which are provided as portions of an adhesive tape. Adhesive tapes are conventionally provided in fixed lengths, such as product by the meter, for example, or as continuous product, in the form of rolls (Archimedean spiral) or coils wound onto a core.

Where mention is made of an adhesive strip hereinafter, the reference is always to an elastic adhesive strip.

In the sense of the invention, an adhesive tape comprehends all sheetlike structures such as two-dimensionally extended films or film portions, tapes with extended length and limited width, tape portions and the like, and lastly also diecuts. An adhesive tape in the sense of the invention may have been furnished with an adhesive on one or both sides. Adhesive tapes typically have running lengths of a few 10 m to 30 000 m. Typical widths for adhesive tape rolls or adhesive tape coils are 10, 15, 19, 25 and 30 mm. Other running lengths and adhesive tape widths also exist, however, and are not excluded from the teaching of the invention. The adhesive tape may be in the form of a roll, in other words in the form of an Archimedean spiral wound up onto itself, or may have been wound onto a spool element.

An adhesive tape has a superficially extended top side and a bottom side opposite the top side. Top side and bottom side are in a substantially coplanar arrangement at a distance d corresponding to the thickness of the adhesive tape, and each have a width b. At the edges of the adhesive tape there are edge faces whose face normals are arranged substantially perpendicular to the face normals of the top side and of the bottom side. The virtual perpendicularity of the edge faces is a result of the production of an adhesive tape from a parent roll on high-precision manufacturing lines which slit off multiple adhesive tapes from a parent roll—that is, the parent roll is singulated by means of roll knives, for example. Another effect of the manufacturing lines is that the edge faces of an adhesive tape are virtually planar, thus being uniformly flat both in the longitudinal direction of the adhesive tape, and hence also over the thickness d of the adhesive tape. The width b of an adhesive tape is typically greater than or at least the same as the thickness d. The edge faces therefore have a high surface quality and are exact in their geometric arrangement relative to the top and bottom sides of the adhesive tape. The longitudinal direction is indicated by the direction of the adhesive tape in which it is wound or unwound. An adhesive tape has the longest extent in the longitudinal direction.

An adhesive strip in the sense of the invention comprehends a portion removed from an adhesive tape. In the sense of this invention the general expression "adhesive strip" embraces all sheetlike structures furnished self-adhesively on one or both sides, such as two-dimensionally extended films or film portions, tapes with extended length and limited width, tape portions, diecuts and the like, and also corresponding multilayer arrangements. The geometries and properties of the adhesive tape described above are also valid for adhesive strips, since an adhesive strip in the sense of the invention is merely a removed part of an adhesive tape.

The length of an adhesive strip is therefore always less than the length of an adhesive tape. As a result of its removal from the adhesive tape, an adhesive strip generally has two cut edges. The cut edges form the front sides of the adhesive strip. They typically have a substantially perpendicular arrangement. Since, however, an adhesive strip is frequently removed only when in use, by a worker or by a machine, it cannot be assumed here that the front side will have such a high surface quality and exact geometric arrangement as compared with the top side and the bottom side of the adhesive strip, or the edge faces.

The invention skillfully takes account of this technical effect in that the arrangement of the housing seal is such that only the well-defined edge faces of the adhesive tape strips are brought into contact with one another and form the sealing gap.

The arrangement of the housing seal in accordance with the invention effectively avoids the use of cut edges generated at the location of application, such as the works hall or factory hall, which form a sealing gap and seal it off. The invention instead uses the edge faces of the adhesive strip, as may be produced with a high manufacturing precision, in order to produce a sealing gap at the works.

Furthermore, the housing seal of the invention also acknowledges the fact that in an automated application operation, the front sides of the adhesive strips cannot be applied infinitely close to or even in contact with a housing element by an applicator. An automated adhesive tape applicator, preferably a robot-guided adhesive tape applicator, is subject to limitations which prevent or at least greatly hinder the application of adhesive tapes from continuous portions which are in contact with one another via their front sides. The housing seal of the invention circumvents this application problem by disposing the adhesive strips with an offset next to one another such that a portion of the first edge face of the adhesive strip is in contact with a portion of the second edge face of the adhesive strip and forms a sealing gap at this contact region. The front sides not cleanly parted are not used. As a result, in particular, the surface quality of the front sides of the first adhesive strip and their precise geometric arrangement become negligible with regard to the achievement of the sealing effect of the housing seal.

"Elastic" refers to the property of an adhesive strip or adhesive tape of changing its geometric shape on exposure to force and, when the exposure force drops away, of reverting to the original shape existing prior to the force exposure. In this context the term "elastic" is intended to comprehend not only linear-elastic behavior on the part of the adhesive strips but also non-linear elastic behavior on the part of the adhesive strips. As the adhesive strips comprise polymer materials, the term "elastic" also comprehends a viscoelastic behavior.

If the first housing element and the second housing element are pressed against one another with a force F, the elastic adhesive strip is compressed, i.e., deformed, and expands in the direction of the edge faces, in other words transverse to the longitudinal direction of the adhesive strip. The force in this case acts superficially, preferably equidistributed over the entire contact area between the adhesive strip and the first and second housing elements, in other words uniformly distributed over the top side and bottom side of the adhesive strip, and not, for instance, locally.

As a result of the expansion of the adhesive strips in the direction of the edge faces, the edge faces of the adhesive strip that are in contact are pressed against one another and so seal off the sealing gap. In that case, fluid communication between the housing interior and the housing exterior is reliably prohibited.

Because the housing seal is not inherently closed, but instead consists of a finite adhesive strip in strip form, the sealing gap is the weak point for the sealing. As has emerged, the arrangement of the adhesive strip is very important. It has an important influence on the one hand on the sealing of the housing seal and on the other hand on the operational reliability of the automated application. The properties of the adhesive strips and their layer construction, however, must also be tailored to this use.

The adhesive strip comprises a pressure sensitive adhesive, this being an adhesive which even under relatively weak applied pressure permits a permanent bond to virtually any substrates. At room temperature, a pressure sensitive adhesive has a permanent tack, thus having a sufficiently low viscosity and a high touch-stickiness, and so it wets the surface of the respective bonding substrate even with low applied pressure. The bondability of the adhesive derives from its adhesive properties, and the redetachability from its cohesive properties.

An adhesive in the sense of the invention may be an adhesive based on natural rubber, synthetic rubber or acrylate. Other adhesives may also be used, however. Besides the adhesive, the composition may further comprise substances such as, for example, chemical or mechanical stabilizers, color pigments, fibers, granules, phosphorescent substances, substances with medicinal activity or medicinal products, magnetic or magnetizable particles, or other substances which may condition the properties of the adhesive. In particular the term "adhesive" also comprehends a pressure sensitive adhesive.

A "pressure sensitive adhesive" is understood, in accordance with the general understanding of the skilled person, to refer to a viscoelastic adhesive whose set, dry film at room temperature is permanently tacky and remains adhesive and may be bonded to a multiplicity of substrates by gentle applied pressure.

As a result of the fact that the housing seal of the invention is adhered on one side to one of the housing elements, the housing seal remains at the site at which it has been applied. In particular it does not fall out, as is the case with sealing rings, sealing cords or flat seals which lack self-adhesiveness. As well as the resultant handling advantages, this ensures that the sealing effect of the housing seal is regained—in spite of the opening of the housing and parting of the housing elements from one another—on reclosure, as there is no change in the arrangement of the adhesive strip.

An adhesive tape consists in general of a carrier and at least one adhesive applied thereon. However, there are also adhesive tapes without carrier. With particular preference the adhesive strip has a carrier-free construction, the carrier thus being formed by an adhesive itself, and the adhesive having a high cohesion.

As has emerged, the arrangement of an adhesive strip in accordance with the invention can be used advantageously for sealing housings, on the one hand permitting simple, reliable and precise application and on the other hand enabling easy disassembly and even reclosability of the housing elements of a housing.

A possible advantageous development of the housing seal is that wherein a longitudinal direction of a first end portion of the adhesive strip and a longitudinal direction of a second end portion of the adhesive strip run parallel at least in portions.

By the parallel arrangement, at least in portions, of the first end portion to the second end portion, the first and second edge faces of the adhesive strip are also in a parallel arrangement. The edge faces which are in contact and which form the sealing gap are thus arranged lying flatly on one another. As a result, the sealing gap is sealed off in a particularly uniform manner, as on sealing the force acting on the edge faces in contact as a result of the expansion of the adhesive strips is distributed uniformly.

A longitudinal direction of the adhesive tape refers to the direction in which an adhesive tape is typically unwound. This direction is defined, generally speaking, by the lengthwise extent of the adhesive tape. In the case of adhesive tape portions or adhesive tape cut shapes whose portion or cut shape is shorter than the width of the region of adhesion, the longitudinal direction of the adhesive tape is defined by the shorter extent of the portion or cut shape. Diecuts or labels are also to be included by references to portions or cut shapes.

As a result of the parallel arrangement, in particular, the edge faces are in a coplanar arrangement, in other words lying in a plane, and this leads to a better sealing effect in the sealing gap when the first housing element and the second housing element are pressed against one another with a force F.

This arrangement also simplifies the application of the adhesive strips, since during an application operation the adhesive strip is moved only linearly, thus without describing a curvature or curve, in the region of the edge faces that are in contact. Another effect of this is that the application operation can be carried out more simply and more reliably and that a sealing effect of the housing seal can be ensured.

It is, however, also possible to allow the adhesive strip to describe a curve in the region of the edge faces that are in contact. It has emerged that a sufficient sealing effect can be achieved even with such an arrangement.

The construction or the layer sequence of the adhesive strip encompasses a plurality of variants. In one preferred configuration of the elastic adhesive strip, the adhesive strip comprises a polymer foam layer and a pressure sensitive adhesive layer. The uncoated side of the polymer foam layer has a weaker peel adhesion than the pressure sensitive adhesive layer. The polymer foam layer preferably comprises at least one poly(meth)acrylate.

A possible advantageous development of the housing seal is that wherein the adhesive strip comprises a polymer foam layer, and a first side of the polymer foam layer has a pressure sensitive adhesive layer.

The polymer foam layer, more particularly the matrix material of the polymer foam layer, comprises at least one poly(meth)acrylate. A "poly(meth)acrylate" is a polymer which is obtainable by radical polymerization of acrylic and/or methacrylic monomers and also, optionally, further, copolymerizable monomers. More particularly a "poly(meth)acrylate" is a polymer whose monomer basis consists to an extent of at least 50 wt % of acrylic acid, methacrylic acid, acrylic esters and/or methacrylic esters, where acrylic esters and/or methacrylic esters are included at least proportionally, preferably to an extent of at least 30 wt %, based on the overall monomer basis of the polymer in question.

The polymer foam layer preferably comprises poly(meth)acrylates at in total 40 to 99.9 wt %, more preferably at in total 60 to 98 wt %, more particularly at in total 75 to 95 wt %, for example at in total 80 to 90 wt %, based in each case on the total weight of the polymer foam layer. There may be one (single) poly(meth)acrylate or two or more poly(meth)acrylates present; in the continuation of the present description as well, therefore, the plural expression "poly(meth)acrylates" includes in its meaning, as does the expression "in total", the presence both of a single poly(meth)acrylate and of two or more poly(meth)acrylates.

The glass transition temperature of the poly(meth)acrylates is preferably <0° C., more preferably between −20 and −50° C. The glass transition temperature of polymers or of polymer blocks in block copolymers is determined in the invention by means of dynamic scanning calorimetry (DSC). For this technique, around 5 mg of an untreated polymer sample are weighed into an aluminum crucible (volume 25 μl) and closed with a perforated lid. Measurement takes place using a DSC 204 F1 from Netzsch. For inertization, the procedure takes place under nitrogen. The sample is cooled first to −150° C. then heated at a heating rate of 10 K/min to +150° C., and cooled again to −150° C. The subsequent second heating curve is run again at 10 K/min and the change in the heat capacity is recorded. Glass transitions are recognized as steps in the thermogram.

The poly(meth)acrylate preferably comprises at least a proportionally copolymerized functional monomer, more preferably a monomer which is reactive with epoxide groups to form a covalent bond. Very preferably the proportionally copolymerized functional monomer, more preferably monomer reactive with epoxide groups to form a covalent bond, contains at least one functional group selected from the group consisting of carboxylic acid groups, sulfonic acid groups, phosphonic acid groups, hydroxyl groups, acid anhydride groups, epoxide groups and amino groups; more particularly it contains at least one carboxylic acid group. Very preferably the poly(meth)acrylate comprises proportionally copolymerized acrylic acid and/or methacrylic acid. All of the groups stated exhibit reactivity with epoxide groups, so making the poly(meth)acrylate advantageously amenable to thermal crosslinking with epoxides that are introduced.

The poly(meth)acrylates are preferably crosslinked by means of epoxide(s) and/or by means of one or more substances containing epoxide groups. The substances containing epoxide groups are, more particularly, polyfunctional epoxides, i.e., those having at least two epoxide groups; correspondingly there is, all in all, an indirect linking of the building blocks of the poly(meth)acrylates that carry the functional groups. The substances containing epoxide groups may be both aromatic and aliphatic compounds.

The pressure sensitive adhesive layer comprises one or more poly(meth)acrylates preferably to an extent of at least 50 wt %, more preferably at least 70 wt %, very preferably at least 90 wt %, more particularly at least 95 wt %, for example at least 97 wt %, based in each case on the total weight of the pressure sensitive adhesive layer.

The poly(meth)acrylate of the outer pressure sensitive adhesive layer has its origins in particular in a monomer composition consisting of 70 to 95 wt % of 2-ethylhexyl acrylate, n-butyl acrylate and/or isobornyl acrylate, more particularly n-butyl acrylate and 2-ethylhexyl acrylate;

1 to 15 wt % of acrylic acid; and 0 to 15 wt % of methyl acrylate.

The poly(meth)acrylates of the outer pressure sensitive adhesive layer are crosslinked preferably thermally, more particularly covalently and/or coordinatively. Preferred covalent crosslinkers are epoxy compounds; preferred coordinative crosslinkers are aluminum chelates.

The weight-average molecular weight $M_w$ of the poly(meth)acrylates of the outer pressure sensitive adhesive layer is preferably 20 000 to 2 000 000 g/mol, more preferably 100 000 to 1 500 000 g/mol, more particularly 200 000 to 1 200 000 g/mol. The figures for the average molecular weight $M_w$ in this specification are based on the determination by gel permeation chromatography.

A possible advantageous development of the housing seal is that wherein the polymer foam layer itself is a pressure sensitive adhesive, more particularly a pressure sensitive adhesive, acrylate-based polymer foam, more particularly comprising at least one poly(meth)acrylate. With regard to the properties and formulations, reference may be made at this point to the preceding observations regarding the polymer foam layer, more particularly the matrix material of the polymer foam layer.

The housing seal is able as a result to profit from the advantages in sealing that are possessed by acrylate-based pressure sensitive adhesives. An acrylate-based polymer foam has viscoelastic properties. As a result, the first and second adhesive strips, on contact of the first and second edge faces of the first and second end portions, flow onto the first and second edge faces of the second adhesive strip. The flowing-on behavior known for viscoelastic materials, which can be equated with strong wetting of a surface, improves the sealing effect of the housing seal in the sealing gap. An acrylate-based polymer foam, moreover, has very good temperature stability in temperature ranges of −20-+120° C., with an acrylate-based polymer foam even withstanding temperatures up to 220° C. over the short term. These pressure sensitive adhesives, moreover, have outstanding cold shock resistances, and this is very important for numerous applications, in the field of automobile construction, for example. One particularly important property of acrylate-based polymer foams is that they have elongations at break of 1000% or more. This means that an acrylate-based polymer foam can be stretched to a particularly great extent without breaking. This property is particularly advantageous for the housing seal of the invention, allowing it to be pressed particularly strongly between the housing parts. The resultant expansion of the polymer foam to the edge faces means that the sealing gap is reliably sealed off and withstands relatively high pressure differences between housing interior and housing exterior. The high tear strength also makes it possible to compensate differences in thermal expansion of materials that are unalike. As a result, the housing elements to be sealed off can be manufactured from different materials having very different coefficients of thermal expansion. For example, a housing cover may be made of ABS material (acrylonitrile-butadiene-styrene copolymer), and a housing tub of aluminum. The plastics material has a substantially lower coefficient of thermal expansion by comparison with aluminum. Moreover, the acrylate-based polymer foam exhibits outstanding aging resistance, moisture resistance and chemical resistance, this being particularly advantageous for the reliability and longevity of the housing seal.

A possible advantageous development of the housing seal is that wherein the adhesive strip comprises a further pressure sensitive adhesive layer, where a second side of the polymer foam layer bears the applied further pressure sensitive adhesive layer, and the second side is opposite the first side. The further pressure sensitive adhesive layer preferably corresponds to one of the aforesaid formulations of the pressure sensitive adhesive layer.

With particular preference the peel adhesion of the further adhesive layer applied on the second side of the polymer foam layer is weaker than the peel adhesion of the pressure sensitive adhesive layer applied on the first side of the polymer foam layer. In other words, one side of the polymer foam layer is weakly adhesive. This means that the peel adhesion on one side of the polymer foam layer is lower than on the other side. This is intended to mean that the adhesion force of the weakly adhesive layer is less than the adhesion force of the layer by which the elastic adhesive strip is applied, i.e., adhered, to a housing element. This can be achieved by means of a pressure sensitive adhesive layer which is applied to the polymer foam layer and has only weakly adhesive properties. Although in that case first or second housing element then attaches more strongly to the further adhesive layer, it is nevertheless also possible in this way to improve the sealing effect between the first and second housing elements. The fact that the second side of the polymer foam layer has a further adhesive layer improves the sealing effect between the housing element and the polymer foam layer—that is, on the top side of the adhesive strips, for example. The reference here is not to the first and second sealing gaps, but rather to the top or bottom side, arranged perpendicularly to said gaps, of the first and second adhesive strips which are in contact with the housing elements. Where this one side is weakly adhesive, it is possible more reliably to prevent fluid communication also at the contact faces between housing element and adhesive strip (top side, bottom side of the adhesive strips).

On the other hand it is possible, through the weakly adhesive form of a further adhesive layer, to ensure that the housing seal, when the housing elements are parted and separated from one another, remains completely on the housing element which is in contact with the pressure sensitive adhesive layer having the greater peel adhesion. Where one side of the adhesive strips has a sufficiently low peel adhesion, the first and second housing elements can be separated again after they have been assembled, without the housing seal being damaged, let alone destroyed, in the process. The housing seal can therefore be used again, this being sustainable and removing the need for further application or arrangement of a seal, and hence saving time. Because of this it becomes possible to reopen a housing without problems in order to carry out repair, replacement or revision of components located in the housing—battery components, for example.

A possible advantageous development of the housing seal is that wherein a second side of the polymer foam layer, which is opposite the first side, has a thermoplastic film, or the thermoplastic film is applied on the further pressure sensitive adhesive layer.

A thermoplastic film has very minimum adhesive properties or none at all, and so in any conceivable construction of the adhesive strip comprising a thermoplastic film on the second side of the polymer foam layer, the second or first housing element can be detached without residue and free from attachment force. Where one side of the adhesive strips has a very low peel adhesion or none (non-adhesive), the first and second housing elements, after they have been assembled, can be parted again without the housing seal being damaged, let alone destroyed. This detachment may be performed without residue. The housing seal can then be used again, this being sustainable and removing the need for further application or arrangement of a seal, and hence saving time. As a result it becomes possible to reopen a housing without problems in order to carry out repair, replacement or revision of components located in the housing.

The thermoplastic film preferably comprises at least one polymer selected from the group consisting of thermoplastic polyolefins (TPE-O or TPO), more particularly thermoplastic polyolefin elastomers (POE) and thermoplastic polyolefin plastomers (POP); thermoplastic polystyrene elastomers (TPE-S or TPS), more particularly styrene block copolymers (SBC); thermoplastic polyurethane elastomers (TPE-U or TPU); thermoplastic polyester elastomers and copolyesters (TPE-E or TPC); thermoplastic copolyamides (TPE-A or TPA); and thermoplastic vulcanizates and also crosslinked thermoplastic polyolefin elastomers (TPE-V or TPV).

The thermoplastic film more particularly consists of at least one, more preferably one, polymer selected from the group consisting of thermoplastic polyolefins (TPE-O or TPO), more particularly thermoplastic polyolefin elastomers (POE) and thermoplastic polyolefin plastomers (POP); thermoplastic polystyrene elastomers (TPE-S or TPS), more particularly styrene block copolymers (SBC); thermoplastic polyurethane elastomers (TPE-U or TPU); thermoplastic polyester elastomers and copolyesters (TPE-E or TPC); thermoplastic copolyamides (TPE-A or TPA); and thermoplastic vulcanizates and also crosslinked thermoplastic polyolefin elastomers (TPE-V or TPV).

With particular preference the adhesive strip has a thickness d of between 0.1 mm+/−0.02 mm and 8.0 mm+/−0.2 mm, more preferably a thickness d of between 1.5 mm+/−0.2 mm and 3.0 mm+/−0.2 mm.

If the thickness d is less than 0.1 mm, the adhesive strip may be too greatly compressed when pressed together between the housing elements, and may tear apart, so making the housing seal no longer seal.

If the thickness d is greater than 8.0 mm, it may be the case that the adhesive strips expand very greatly when pressed together between the housing elements, and swell out between the housing elements. In that case, however, there is still a sealing effect.

Particularly preferred, therefore, is a thickness d of between 1.5 mm and 3.0 mm. Adhesive strips having such thicknesses are able sufficiently to absorb force when pressed together, but also do not swell out between housing elements.

It is preferred, if the first housing element and the second housing element are pressed against one another with a force F, that the thickness d of the adhesive strip is reduced by 10% to 60%, more preferably by 30% to 50%. This achieves sufficient expansion of the first and second adhesive strips, and so the sealing gap is sealed off. There is a proportional relationship between the reduction in the thickness d and in the force F. The greater the force F acting on the first and second housing elements, the greater the reduction in the thickness d of the first and second adhesive strips. The thickness d is preferably reduced between 10% and 60%. The effect of a reduction of at least 10% is that the applied pressure is sufficiently great to achieve sufficient expansion of the adhesive strips, and so the sealing gap is sealed off.

The reduction in thickness, however, must also not be too great, since otherwise the adhesive strip could expand very greatly when pressed together between the housing elements, and could swell out between the housing elements. There may also be damage to the adhesive strips. In particular, in the case of a multilayer construction, an excessive compression, i.e., reduction in the thickness d, may lead to delamination of the polymer foam layer from one pressure sensitive adhesive layer, or to delamination of the polymer foam layer from the thermoplastic film, with the possibility of consequent leaks.

A reduction in the thickness d of between 30% and 50% is advantageous particularly for adhesive strips comprising foamed polymer foam layers based on acrylates. In this way a good sealing effect is ensured and damage to the adhesive strip is avoided.

A possible advantageous development of the housing seal is that wherein a length l of the first end portion and of the second end portion, in which the first edge face and the second edge face are in contact, amounts to at least one width b of the adhesive strip. As a result, the length of the edge faces of the adhesive strip that are in contact is such as to ensure reliable sealing.

The object is achieved in its second aspect by a method for automated application of a housing seal.

The method comprises the steps of
a) providing a first housing element,
b) applying an elastic adhesive strip by means of a robot-guided application head along a predetermined contour on the first housing element by
traveling the contour and at the same time unwinding and pressing-on an adhesive strip material from an adhesive strip roll,
removing the adhesive strip material at the end of the traveled contour by the application head, and
depositing the adhesive strip removed from the adhesive strip material on the first housing element, so that a first edge face of a first end portion of the adhesive strip and a second edge face of a second end portion of the adhesive strip are arranged adjacent to one another,
where the adhesive strip is applied by the robot-guided application head on the first housing element such that a first edge face of the adhesive strip is in contact with a second edge face of the adhesive strip and they form a sealing gap.

Firstly, the particular arrangement of the adhesive strips of the housing seal enables automated application by means of a robot-guided application head. Secondly, application of a continuous product by a robot-guided application head is only made possible by virtue of the fact that the housing seal can be realized by an adhesive strip. The arrangement of the housing seal in accordance with the invention therefore has particular advantages in relation to its application by a robot-guided application head.

The housing seal has the properties and advantages set out in the text above, which therefore are not repeated at this point.

The term "contour" is intended to denote a predetermined travel path for a robot-guided application head. A robot is any multiaxial—at least biaxial—robot. At its most simple, it is a plotter or a gantry robot. However, SCARAs or five-axis and multiaxial industrial robots are also covered by the term "robot" in the sense of this invention.

An application head means an apparatus with which an adhesive tape can be unwound from a roll and the unwound part of the adhesive tape can be removed. Such application heads are known in the prior art.

A possible advantageous development of the method is that wherein the application head is moved during application such that a part of the edge face of the adhesive strip and a part of the second edge face of the adhesive strip are brought into contact. Because the edge faces of the adhesive strip are already in contact before the second adhesive strip is placed on the first housing element, it is possible for the second edge face of the adhesive strip to conform closely to the first edge face of the adhesive strip when it is deposited on the first housing element. As a result of this, it is possible for a sealing effect to be generated more reliably. The operation of applying the housing seal hence becomes more reliable, and the risk of leaks is reduced.

The requirements regarding the orientation and positioning of the robot-guided application head are reduced, moreover, because the second adhesive strip "moves correctly" when it is deposited. It is, however, important for the first and second end portions of the adhesive strip to overlap in their longitudinal direction, in other words not to be deposited, for instance, with a spacing from one another, so that after deposition on the first housing element there is a gap or a space between first and second adhesive strips.

Test Methods

Gel Permeation Chromatography for Determining the Molecular Weight:

The figures for the molecular weight in this specification are based on the determination by gel permeation chromatography. The determination is made on 100 µl of sample which has undergone clarifying filtration (sample concentration 4 g/l). The eluent used is tetrahydrofuran with 0.1 vol % of trifluoroacetic acid. The measurement is made at 25° C. The precolumn used is a column of type PSS-SDV, 5µ, $10^3$ Å, ID 8.0 mm×50 mm. Separation takes place using the columns of type PSS-SDV, 5µ, $10^3$ Å and also $10^5$ Å and $10^6$ Å, each with ID 8.0 mm×300 mm (columns from Polymer Standards Service; detection using differential refractometer Shodex RI71). The flow rate is 1.0 ml per minute. Calibration takes place against PMMA standards (polymethyl methacrylate calibration).

Sealing Test:

A housing seal of the invention was adhered in accordance with the method of the invention to a first square metal plate (external dimensions 80 mm×80 mm×5 mm). The adhesive strip here was arranged such that it forms a closed, approximately square contour in the form of a square. The first and second edge faces of the first and second end portions of the adhesive strip were in contact. Applied inside the square subsequently was a detection paste ($KMnO_4$— potassium permanganate), which undergoes a distinct violet coloration on contact with water. An identical metal plate was then placed onto the construction and secured with screws. The screws were located outside the square composed of the adhesive strip; therefore they did not pass either through the interior of the square or through the adhesive strip itself. The distance between the metal plates was adjusted to exactly 2 mm by means of 2 shims each 1 mm thick. This construction ensured that the water-reactive paste is in a closed space (housing interior) within the adhesive strip. Any penetration of water would be apparent from a color change and would indicate leakage of the housing seal.

The entire sample was then immersed into a water bath, which was then placed into an autoclave. Initially a slight superatmospheric pressure of 0.3 bar was applied; in a second test, a superatmospheric pressure of 3 bar then simulated a water column of 30 m. After 30-minute storage under water in the autoclave, the pressure was let down, the assembly was removed, and examination took place for color change of the KMnO$_4$. A color change indicates water-permeability of the housing seal; no color change indicates sealing with respect to water (result "water-permeable yes/no").

Reopenability of the Bonded Substrate (Simulation of the Reopening of a Bonded Battery Cover):

Using a more strongly adhering side of the adhesive strips (bottom side of the adhesive strips), the housing seal was applied to an aluminum plate (450×250 mm, 2.5 mm thickness) at a distance from the plate edge of 30 mm. The distance between the metal plates was adjusted to exactly 2 mm by means of 2 shims each 1 mm thick, and a joint is formed. A screw clamp was then used to press the assembly together. The aluminum plates were thereafter screwed together using holes present for this purpose in the corners of the plates.

The resulting assembly was stored in a conditioning chamber at 40° C. and 100% relative humidity for 10 days. On removal, it was reconditioned for 24 h at 23° C. and 50% relative humidity.

The screws and shims were then removed, and a tensioning belt connected to a testing machine (Zwick) was inserted into the joint on one of the shorter sides. The upper plate (1 mm thick) was pulled from the housing seal at a rate of 300 mm/min and an angle of 90°, and the maximum force needed to achieve this was recorded. Table 1 reports the average from three measurements.

For the tests of sealing and of reopenability, the adhesive strips were provided by removal of fixed lengths from the following adhesive strip materials:

A—Tesa® 61102 (closed-cell EPDM rubber foam, coated on one side with an acrylate adhesive, total thickness 3200 μm; tesa)

B—Tesa® ACX$^{plus}$ 70730 High Resistance (double-sided acrylate foam tape, coated on both sides with pressure sensitive acrylate adhesive, total thickness 2900 μm; tesa), laminated on one side with a thermoplastic polyurethane film (Platilon® U04/PE, 30 μm; Bayer)

C—Tesa® ACX$^{plus}$ 70730 High Resistance, where the pressure sensitive acrylate adhesive was applied only on one side, so that the acrylate foam was exposed on one side (see B, total thickness 2850 μm; tesa)

D—tesa 92111 HiP—High initial Performance, (bonded on itself 3×, total thickness 3300 μm; tesa); laminated on one side with a thermoplastic polyurethane film (Platilon® U04/PE, 30 μm; Bayer)

E—Tesa® ACX$^{plus}$ 70730 High Resistance; (double-sided acrylate foam tape, coated on both sides with pressure sensitive acrylate adhesive, total thickness 2900 μm; tesa); comparative example

TABLE 1

| | Test results | | |
|---|---|---|---|
| Adhesive strip from adhesive tape | Water permeability at 0.3 bar | Water permeability at 3 bar | Reopenability |
| A | No | Yes | |
| B | No | No | Measurement not required; the bonded assembly was very easy to open by hand |
| C | No | No | 148N |
| D | No | No | Measurement not required; the bonded assembly was very easy to open by hand |
| E (comp.) | No | No | >500N | comp. = comparative example

The invention is described using various exemplary embodiments in nine figures. These show the following:

FIG. 1 Schematic representation of the housing seal

Figure 2:
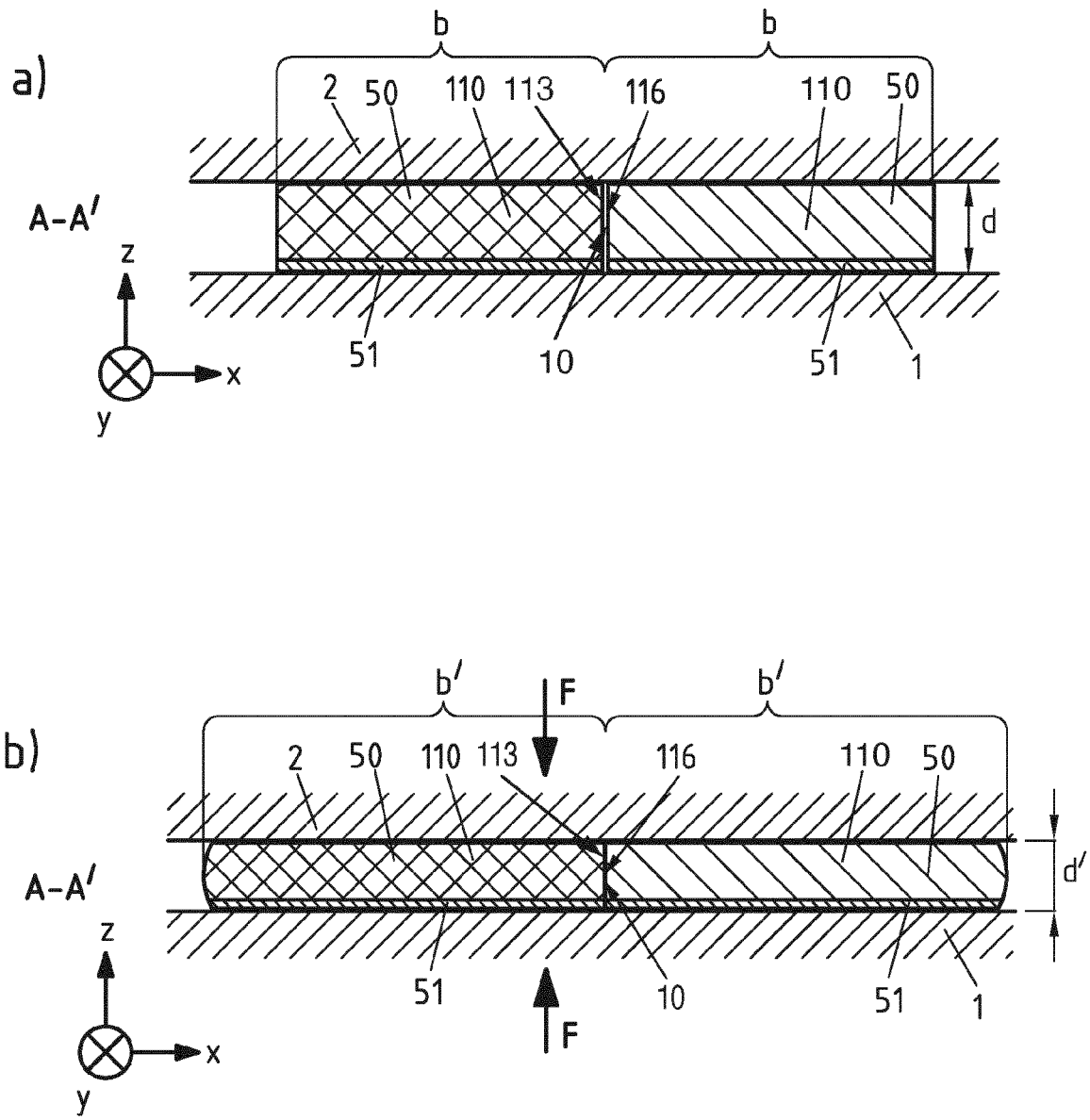

FIG. 2 a)-b) Section through the housing seal

Figure 3:
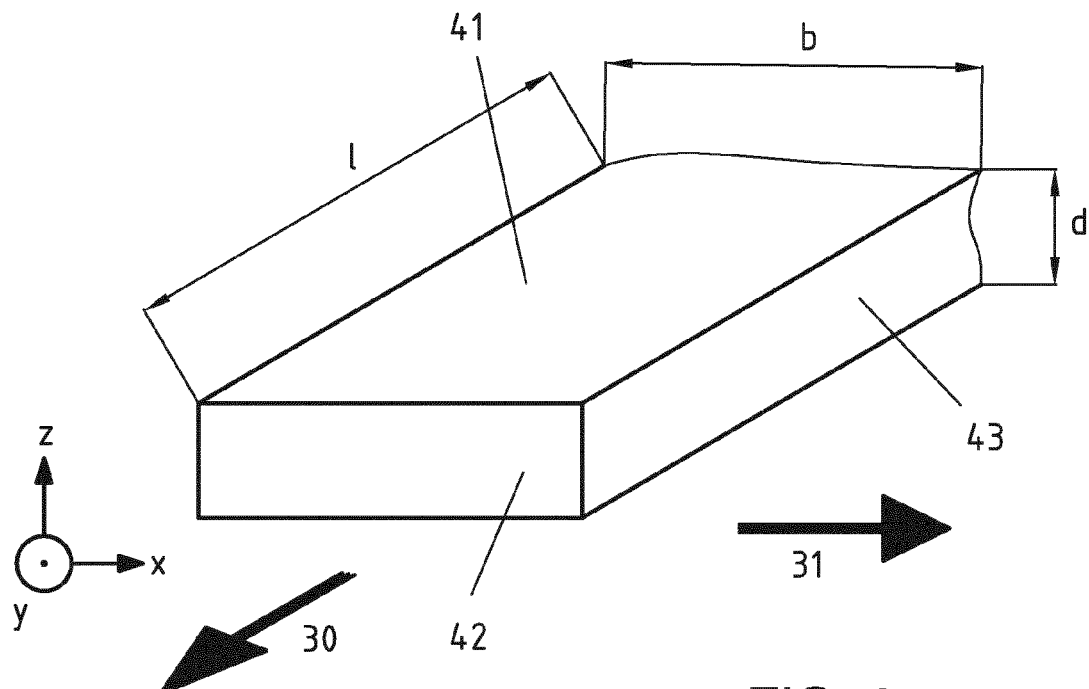

FIG. 3 Definition of the sides and directions of an adhesive strip

Figure 4:
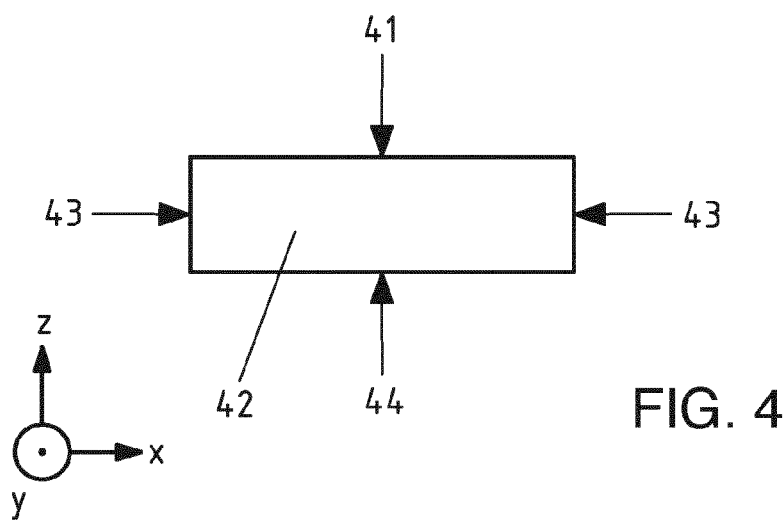

FIG. 4 Definition of the sides and directions of an adhesive strip

Figure 5:
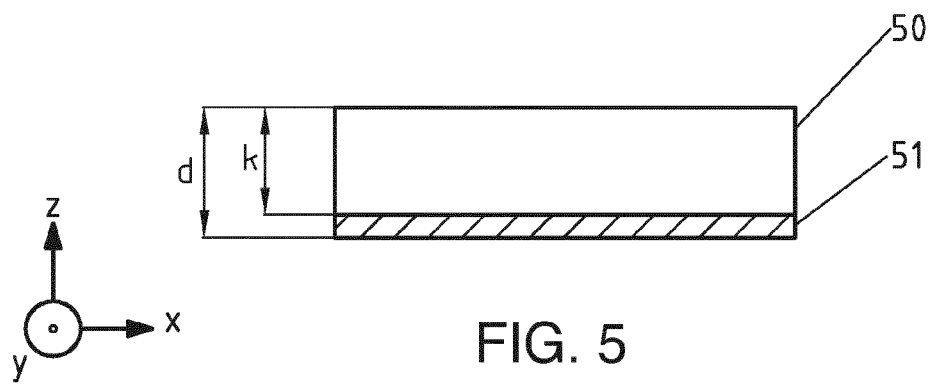

FIG. 5 Layer construction of the elastic adhesive strips in a first variant

Figure 6:
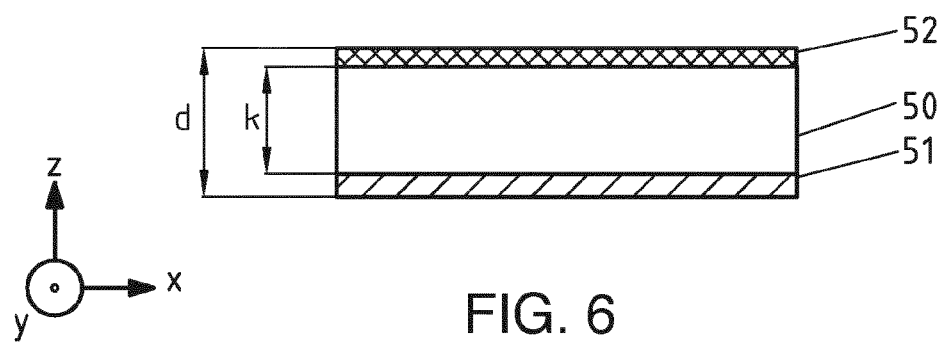

FIG. 6 Layer construction of the elastic adhesive strips in a second variant

Figure 7:
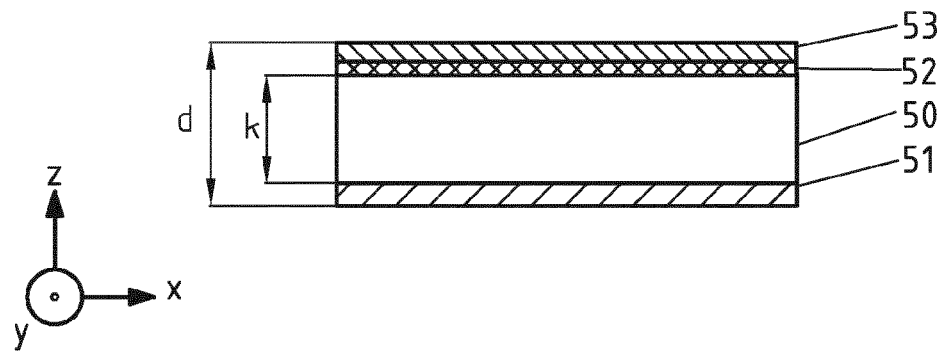

FIG. 7 Layer construction of the elastic adhesive strips in a third variant

Figure 8:
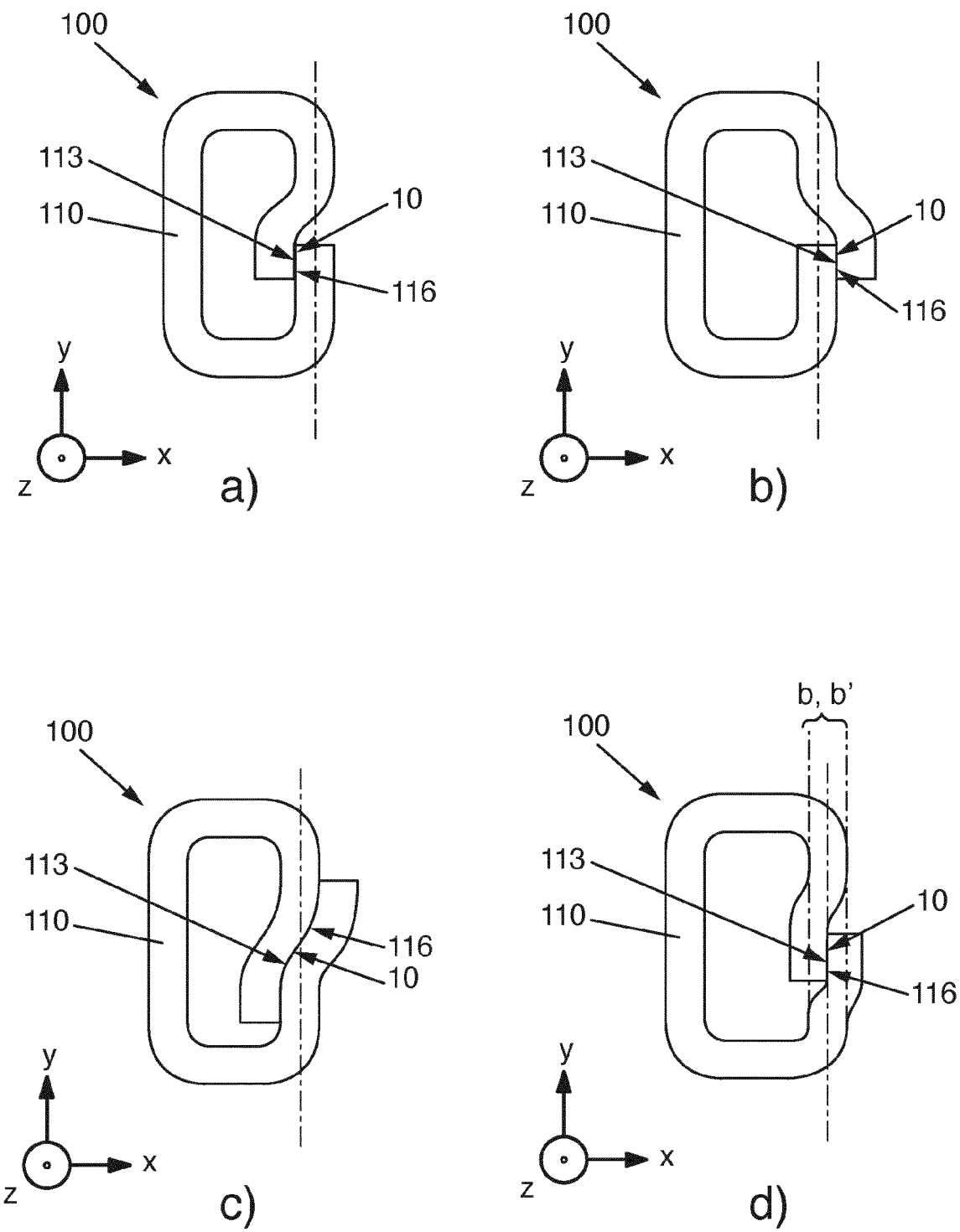

FIG. 8 a)-d) Variants of the arrangement of the housing seal

Figure 9:
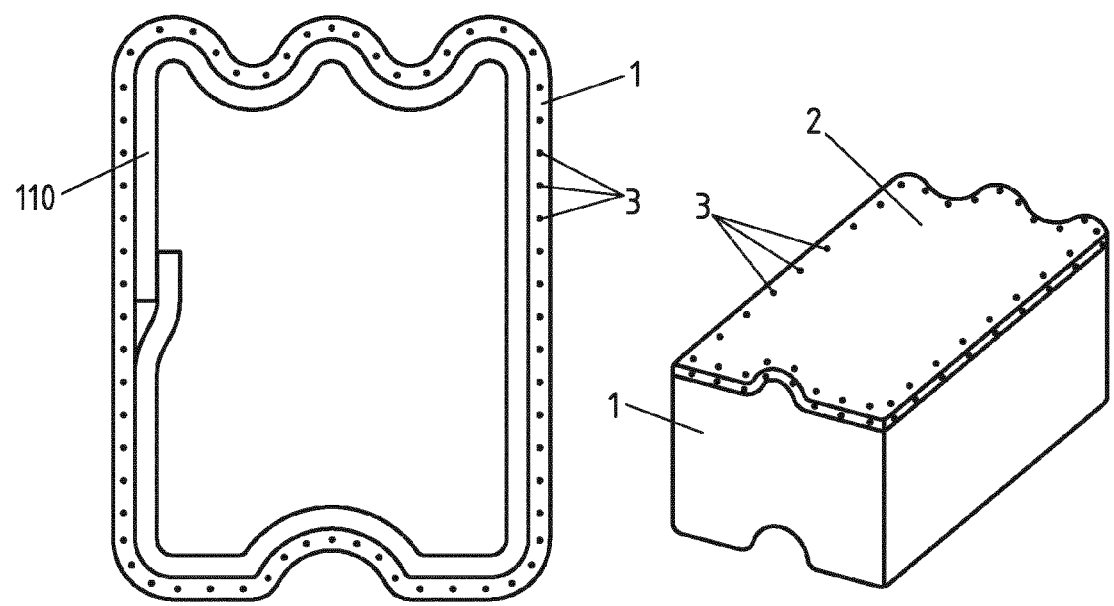

FIG. 9 Illustrative representation of a housing with multipartite housing seal

FIG. 1 represents schematically a plan view of the arrangement of the housing seal 100 of the invention. An adhesive strip 110 is adhered on a first housing element 1 (not represented). The adhesive strip here forms a near circulation. The first and second front sides 112 and 115 of the adhesive strip 110 are arranged such that they pass one another and do not make contact. In a first end portion 111 of the adhesive strip 110 and in a second end portion 114 of the adhesive strip, the first edge face 113 of the adhesive strip 110 and the second edge face 116 of the first adhesive strip 110 are in contact and form the sealing gap 10.

FIG. 2 represents a section through the housing seal. The section lies in the plane AA'—FIGS. 2 a) and b). The position of the sectional plane is also drawn in FIG. 1.

In FIG. 2 a) a section is represented in the sectional plane AA' through the elastic adhesive strip 110 in the region of the first and second end portions 111 and 114. In this case the adhesive strip 110 is adhered on the first housing element 1 by means of the pressure sensitive adhesive layer 51. FIG. 2 a) shows the housing seal, i.e., after an application procedure by an application head. Moreover, the second housing element 2 is placed on the top side of the first and second adhesive strips. The top side of the adhesive strip in this version is formed by the top side of the polymer foam layer 50 of the adhesive strips 110. The edge faces 113 and 116 of the elastic adhesive strip 110 are in contact with one another, or the edge faces 113 and 116 are at least opposite one another and make only partial contact with one another, or none. The sealing gap 10 is formed between the edge faces 113 and 116. The first and second housing elements 1 and 2 are distanced from one another by the thickness d of the adhesive strip.

FIG. 2 b) represents the same sectional plane AA' as in FIG. 2 a), with the difference that a force F is acting on the housing elements 1 and 2. As a result, the elastic adhesive strip 110 is compressed and the spacing of the housing elements 1 and 2 is reduced to the spacing d' (d>d'). In particular the polymer foam layer 50 of the adhesive strip is compacted and its material compressed. Exposure to the force F causes the polymer foam layers 50 of the first and second elastic adhesive strips 110 to expand in the direction of the edge faces. This is indicated by the bulging of the edge faces. The first and second edge faces 113 and 116 have hardly any ability, or none, to expand or bulge, since these edge faces are already in contact. The expansion instead causes a force and an opposing force to act on the first and second edge faces 113 and 116, thereby pressing the first and second edge faces 113 and 116 against one another and causing them to seal off the sealing gap 10.

Represented in FIG. 3 are the sides and directions of an adhesive strip 110. The top side 41 of the adhesive strip is arranged substantially perpendicular to the front side 42 and the edge faces 43. The longitudinal direction of the adhesive strip extends in the direction of the length l of the adhesive strips and is perpendicular to the transverse direction 31 of the adhesive strip. Parts of the edge faces 43 form the sealing gap 10 (not represented) when the elastic adhesive strip expands in the direction of the transverse direction when the adhesive strip is compressed. The adhesive strips have the thickness d, the width b and the length l.

FIG. 4 represents a front-side plan view of the front sides 42, 112, 115 of an adhesive strip. The front sides of an adhesive strip are generated by removal from an adhesive tape. The bottom side 44 is arranged opposite the top side 41.

FIG. 5 represents a first preferred layer construction of an elastic adhesive strip 110. The polymer foam layer 50 has a pressure sensitive adhesive layer 51 on the bottom side. The polymer foam layer has the thickness k, and the overall adhesive strip has the thickness d.

FIG. 6 represents a second preferred layer construction of an elastic adhesive strip 110. As in FIG. 5, the polymer foam layer 50 has a pressure sensitive adhesive layer 51 on the bottom side. On the top side, this being the second side opposite the first side of the polymer foam layer, there is a further pressure sensitive adhesive layer 52. The peel adhesion of the further pressure sensitive adhesive layer 52 is less than the peel adhesion of the pressure sensitive adhesive layer 51. The polymer foam layer 50 has the thickness k, and the overall adhesive strip 110 has the thickness d. In the case of this second variant, therefore, a housing seal 100 is generated wherein the peel adhesions are asymmetric on the top and bottom sides of the adhesive strip 110.

FIG. 7 represents a third preferred layer construction of an elastic adhesive strip 110. As in FIGS. 5 and 6, the polymer foam layer 50 has a pressure sensitive adhesive layer 51 on the bottom side. On the top side, this being the second side opposite the first side of the polymer foam layer, there is a further pressure sensitive adhesive layer 52. The peel adhesion of the further pressure sensitive adhesive layer 52 may be less than, equal to or greater than the peel adhesion of the pressure sensitive adhesive layer 51. Applied on the further pressure sensitive adhesive layer 52 is a thermoplastic film 53. The polymer foam layer has the thickness k, and the overall adhesive strip has the thickness d. In the case of this third variant, therefore, a housing seal 100 having single-sidedly nonadhesive properties is generated.

FIGS. 8 a) to d) represent, schematically and illustratively, four preferred variants of the housing seal 100. The profile of the first adhesive strip 110 here is chosen as an example and is not in any way to be deemed limiting. The actual profile, i.e., the contour on which the first adhesive strip is applied, may describe any desired other profiles. Only the first and second edge faces 113 and 116 are to be arranged substantially opposite one another.

FIGS. 8 a) and b) each represent housing seals of the invention, and in FIG. 8 a) the first end portion 111 is arranged in the housing interior. An advantage of this arrangement is that a comparatively straight circulating outer edge can be generated, interrupted only by a short portion. When the force F acts on the first and second housing elements 1 and 2 (not represented), the sealing gap 10 is sealed off.

In FIG. 8 b) a housing seal 100 is represented wherein the second end portion 114 is arranged outside the circulation formed by the adhesive strip 110 (housing exterior). When the force F acts on the first and second housing elements 1 and 2 (not represented), the sealing gap 10 is sealed off. An advantage of this arrangement is that the inner region, enclosed by the seal, is not restricted by the second end portion.

FIG. 8 c) represents a combination of the variants from FIGS. 8 a) and 8 b). Starting from FIG. 8 a), the end portion 114 may be taken outward, as in FIG. 8 b). This arrangement can also be effectively applied in an automated manner with the method of the invention to a housing element (not represented). The advantage of this arrangement of the housing seal 100 is that the sealing gap is extended, allowing sealing to be achieved with respect to greater pressures. When the force F acts on the first and second housing elements 1 and 2 (not represented), the sealing gap 10 is sealed off.

FIG. 8 d) represents a housing seal 100 which at the opposite end portions 111 and 114 requires a lower width than the variant in FIG. 8 c). It is therefore narrower, but otherwise has the same advantages as the variant represented in FIG. 8 c).

FIG. 9 represents by way of example a use of the housing seal 100. The adhesive strip 110 in accordance with the invention is applied on a first housing element 1. The first housing element 1 here is a housing tub. The second housing element 2 is a cover, which is connected to the housing tub by means of connecting elements 3, such as screws, clasps or rivets, for example, and so the force F acts on the housing seal 100 and the adhesive strip 110 is compressed. A housing of this kind may be, for example, a protective housing for battery modules.

LIST OF REFERENCE SIGNS 1 first housing element
2 second housing element
3 connection elements
10 sealing gap
30 longitudinal direction
31 transverse direction
41 top side
42 front side
43 edge face
44 bottom side
50 polymer foam layer
51 pressure sensitive adhesive layer
52 further pressure sensitive adhesive layer (weakly adhering layer)
53 thermoplastic film
100 housing seal 110 elastic adhesive strip
111 first end portion
112 first front side
113 first edge face
114 second end portion
115 second front side
116 second edge face

The invention claimed is:

1. A housing seal for sealing off a housing interior from a housing exterior, the housing seal comprising
   an elastic adhesive strip arranged between a first housing element and a second housing element,
   wherein
      the adhesive strip comprises a first end portion having a first edge face, and a second end portion having a second edge face, wherein the adhesive strip is arranged between the first housing element and the second housing element such that
         the first and second edge faces lie substantially in a plane, and
         the adhesive strip is arranged between the first housing element and the second housing element in a closed circulation, and
         the first edge face of the adhesive strip is in contact with the second edge face of the adhesive strip and forms a sealing gap,
      such that
      the first housing element and the second housing element are pressed against one another with a force F, the elastic adhesive strip is compressed and it expands in the direction of the edge faces, with the effect that the first edge face of the adhesive strip and the second edge face of the adhesive strip are pressed against one another and seal off the sealing gap, thereby preventing fluid communication between the housing interior and the housing exterior.

2. The housing seal of claim 1, wherein a longitudinal direction of a first end portion of the adhesive strip and a longitudinal direction of a second end portion of the adhesive strip run parallel at least in portions.

3. The housing seal of claim 1, wherein the adhesive strip comprises a polymer foam layer, and a first side of the polymer foam layer has a pressure sensitive adhesive layer.

4. The housing seal of claim 3, wherein the polymer foam layer is a pressure sensitive adhesive.

5. The housing seal of claim 4, wherein the pressure sensitive adhesive is a pressure sensitive adhesive, acrylate-based polymer foam.

6. The housing seal of claim 3, wherein the adhesive strip comprises a further pressure sensitive adhesive layer, wherein a second side of the polymer foam layer bears the applied further pressure sensitive adhesive layer, and the second side is opposite the first side.

7. The housing seal of claim 3, wherein a second side of the polymer foam layer, that is opposite the first side, has a thermoplastic film, or the further pressure sensitive adhesive layer bears the applied thermoplastic film.

8. The housing seal of claim 1, wherein the adhesive strip consists of an adhesive tape composed of an acrylate-based adhesive.

9. The housing seal of claim 1, wherein the first housing element and the second housing element are pressed against one another with a force F, the thickness d of the adhesive strip is reduced by 30% to 50%.

10. The housing seal of claim 1, wherein a length l of the first end portion and of the second end portion in which the first edge face and the second edge face are in contact amounts to at least one width b of the adhesive strip.

11. A housing comprising
   a first housing element,
   a second housing element, and
   arranged between the first housing element and the second housing element, a housing seal of claim 1.

12. A method for automated application of the housing seal of claim 1, the method comprising
   a) providing the first housing element,
   b) applying the elastic adhesive strip by means of a robot-guided application head along a predetermined contour on the first housing element by
      traveling the contour and at the same time unwinding and pressing-on an adhesive strip material from an adhesive strip roll,
      removing the adhesive strip material at the end of the traveled contour by the application head, and
      depositing the adhesive strip removed from the adhesive strip material on the first housing element, such that a first edge face of a first end portion of the adhesive strip and a second edge face of a second end portion of the adhesive strip are arranged adjacent to one another,
   wherein the adhesive strip is applied by the robot-guided application head on the first housing element such that a first edge face of the adhesive strip is in contact with a second edge face of the adhesive strip and the first and second edge faces form a sealing gap.

13. The method of claim 12, wherein the robot-guided application head during application is moved such that a part of the edge face of the adhesive strip and a part of the second edge face of the adhesive strip are brought into contact.

* * * * *